No. 658,500. Patented Sept. 25, 1900.
W. H. HOLLIWAY.
WEAR ADJUSTING NUT FOR VEHICLE AXLES.
(Application filed Apr. 26, 1900.)

(No Model.)

Witnesses,
E. A. Brandau

Inventor
William H. Holliway
By Dewey Strong & Co.
Attys

United States Patent Office.

WILLIAM H. HOLLIWAY, OF OAKDALE, CALIFORNIA.

WEAR-ADJUSTING NUT FOR VEHICLE-AXLES.

SPECIFICATION forming part of Letters Patent No. 658,500, dated September 25, 1900.

Application filed April 26, 1900. Serial No. 14,435. (No model.)

*To all whom it may concern:*

Be it known that I, WILLIAM H. HOLLIWAY, a citizen of the United States, residing at Oakdale, county of Stanislaus, State of California, have invented an Improvement in Compensating Wear-Adjusting Nuts; and I hereby declare the following to be a full, clear, and exact description of the same.

My invention relates to a nut for vehicle-axles and for like uses where it is designed to compensate for wear.

It consists of a nut having a screw-threaded interior to fit the end of the shaft or axle, an exterior seat or shoulder for a washer, which fits against the end of the axle-box, and a chamber intermediate between said seat and the screw-threads of such diameter as to receive the end of the axle. This interior chamber is fitted with a coil or other washer, against which the shouldered end of the axle abuts when the nut is screwed into place, and by removing portions of this washer from time to time the nut will turn farther upon the axle and take up any wear between it and the axle-box or like part.

Figure 1:
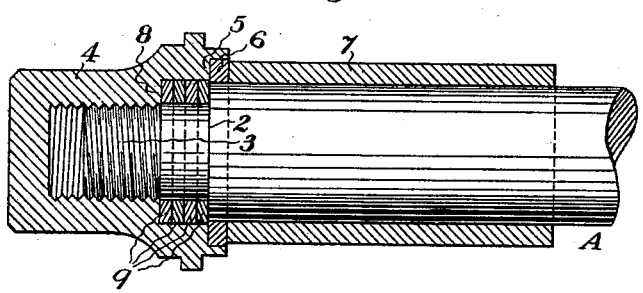
Figure 2:
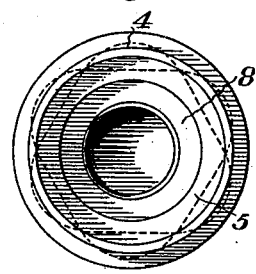

Referring to the accompanying drawings, Figure 1 is a longitudinal section through a nut, showing the application of my invention. Fig. 2 is an inner face view of the nut.

A is the axle, which in the present drawings I have shown as illustrating my invention. The end of the axle has a shoulder 2, and a smaller portion 3, extending beyond, is screw-threaded for a portion of its length, but is devoid of threads at its base portion to form a smooth surface for the washers, hereinafter mentioned. The nut 4 has the inner end of the chamber screw-threaded to fit the screw-threads of the axle end, and the mouth of this chamber is of larger diameter and has a seat or shoulder 5 adapted to receive the washer 6, which surrounds the end of the axle and forms a wearing-surface, against which the end of the axle-box 7 contacts. This washer is of the usual character and is replaced from time to time as it wears. Between this seat and washer and the threaded inner end of the chamber is formed a chamber 8, having a diameter slightly larger than the shouldered end of the axle, so that the latter can enter the chamber. Within this chamber, which is devoid of screw-threads and has a smooth interior, is fitted a washer or series of washers 9, against which the shouldered end 2 of the axle normally abuts when the nut has been screwed on tight. In this condition, the wheel turning upon the spindle, the end of the axle-box will abut against the exterior washer 6, and this suffices until such time as the axle-box or other parts have so worn that it is necessary to take up the surplus wear. This is effected by removing the portion of the supplemental washer 9 against which the shoulder 2 of the axle abuts, so as to allow the nut to be screwed farther upon the threaded end of the axle and the chamber carrying the washer which abuts against the axle-box to be correspondingly advanced, and thus compensate for wear.

The washer 9, contained in the chamber 8, may be a coil or a series of thin metal or other washers or be formed in any suitable manner, so that its length can be reduced from time to time to compensate for wear.

It will be manifest that this device may be applied at any point where end wear of parts which are secured by similar nuts is liable to take place.

Having thus described my invention, what I claim as new, and desire to secure by Letters Patent, is—

The combination with a shaft or spindle having a shoulder at the outer end and a reduced threaded spindle extending beyond said shoulder, said spindle having a threaded outer portion and a base portion devoid of threads, of a nut having interior chambers of three diameters, the smaller chamber being threaded to engage said spindle, the intermediate chamber surrounding the base of the spindle and the larger chamber being in line with the shaft-box, said intermediate and larger chambers having washers with the washers of the intermediate chamber forming contact for the shouldered end of the shaft and lying with their outer peripheries in contact with the smooth inner periphery of the chamber and their inner peripheries in contact with the smooth base portion of the spindle, and the washer of the larger chamber forming contact for the end of the shaft-box, and said intermediate and larger chambers having slightly-greater diameters than the shaft and box respectively.

In witness whereof I have hereunto set my hand.

WILLIAM H. HOLLIWAY.

Witnesses:
W. J. HUGHES,
R. M. BENTLEY.